Figure 9:
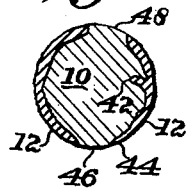

April 13, 1965   O. R. SINGLETON, JR   3,177,579
PROCESS FOR MANUFACTURE OF A ZINC-CLAD ALUMINUM WIRE
Filed Sept. 17, 1959   2 Sheets-Sheet 1
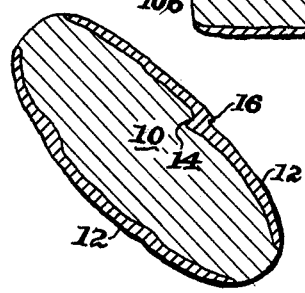
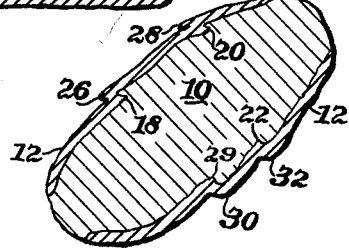
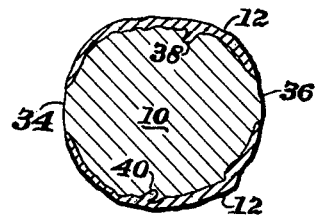
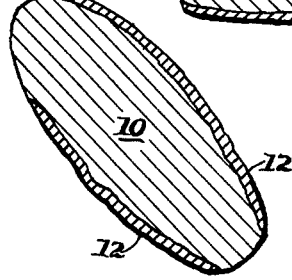
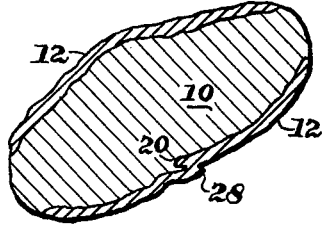
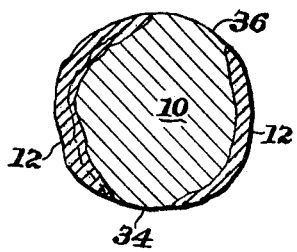
INVENTOR:
Ogle R. Singleton, Jr.
BY Glenn & Jackson
ATTORNEYS.

April 13, 1965      O. R. SINGLETON, JR      3,177,579
PROCESS FOR MANUFACTURE OF A ZINC-CLAD ALUMINUM WIRE
Filed Sept. 17, 1959      2 Sheets-Sheet 2

INVENTOR:

Ogle R. Singleton, Jr.

BY Glenn + Jackson

ATTORNEYS.

United States Patent Office 3,177,579
Patented Apr. 13, 1965

3,177,579
PROCESS FOR MANUFACTURE OF A ZINC-CLAD ALUMINUM WIRE
Ogle R. Singleton, Jr., Richmond, Va., assignor to Reynolds Metals Company, Richmond, Va., a corporation of Delaware
Filed Sept. 17, 1959, Ser. No. 840,742
6 Claims. (Cl. 29—528)

This invention relates to an article of manufacture and a method for making the same. More particularly, this invention provides a novel solderable composite aluminum wire and a method for producing such wire.

Aluminum wire is a well-known article of commerce and appreciated as possessing the advantageous properties of good electrical conductivity and strength combined with low weight. However, the inability to use conventional soldering methods, especially with respect to rosin flux and soft solders, to join aluminum wire, has essentially prevented its extensive use in many areas where its advantages have been desired. Numerous efforts to overcome this disadvantage have been made in the past, such as by providing a skin or coating by dipping or electro-plating aluminum wire with zinc, tin, or iron and tin, or even by casting a compound ingot of a copper shell surrounding an aluminum core, but these methods have not been technically acceptable for one reason or another.

It is an object of this invention to provide a novel composite aluminum wire which retains the existing advantages of aluminum wire but which also has the property of being readily soldered.

It is also an object of this invention to provide a method for making the said composite aluminum wire.

More specifically, it is an object of this invention to provide a wire having an outer cladding of zinc bonded to and covering all or the major portion of the surface of an aluminum core in said wire article.

Additional objects of this invention will be evident from the following description thereof.

The wire article provided by this invention may be viewed as having two component parts, extending along its longitudinal dimension. First, there is a core of aluminum (including, of course, aluminum alloys) which may be considered as forming the main body of the wire. Secondly, there is a cladding of zinc metal, firmly secured to the said aluminum core and extending along its longitudinal dimension. This zinc cladding also extends along the circumference of the wire to cover at least a major portion of its annular surface. According to this invention, the zinc cladding is metallurgically bonded to the aluminum.

As will be understood zinc is a metal which is easily soldered and it has now been found that this characteristic of the zinc metal is imparted to the above-described composite aluminum wire even though the zinc cladding is exceedingly thin and held to the aluminum core only by the said mechanical metallurgical forces.

In addition, this composite wire possesses further properties which also were not predictable prior to its manufacture. For instance, in even the H 18 temper this wire may be bent to zero T bends without harmful flaking or cracking of the zinc cladding. Furthermore, the conductivity of the wire is such that its substitution for copper wire in electrical systems, on an equal conductivity basis, reduces the weight of the wiring system. Moreover, on an equal conductivity basis, the strength of the composite aluminum wire is of the same order as copper wire.

Stated in its simplest terms, the article of this invention is made by the following novel process. A zinc clad aluminum sheet (made according to the processes described in copending application, Serial No. 636,232, filed January 25, 1957, and Serial No. 700,719, filed December 4, 1957), and rolled to the desired thickness, is slit into a number of strips. The rolled sheet advantageously has a thickness varying between 0.1 and 0.3 inch, and the slit strips are preferably 0.5 to 3 inches wide. Each strip will be of generally rectangular cross-section and composed essentially of a long narrow "sandwich" of an aluminum sheet bonded on opposed sides to zinc strip. The original composite sheet has been produced by the rolling technique described in the aforesaid applications, and the zinc sheets are quite firmly bonded to the aluminum strip. The edges of this "sandwich" have, of course, no zinc cladding.

These strips are next rolled into rounds, in a series of passes through appropriate and conventional rolling mills to convert them to generally cylindrical rods. At this stage, it has been found that the differences between the characteristics of aluminum and zinc tend to lead to particular configurational effects in the cross-section forms om the zinc cladding, as will be described fore fully hereinafter.

Next, the rolled round, or semi-round, rods are drawn through a series of dies of desired size to form wires from the rod. During this stage of the process, it is observed that the cross-sectional configuration of the zinc cladding on the rod is generally maintained as the diameter is decreased. That is, the aluminum core and the zinc cladding affixed thereto draw down together, and the cross-section of the wire will compare closely to the cross-section of the rod as respects some features of the orientation of the zinc cladding.

This is significant for it means that the aluminum core does not draw out from under the zinc cladding, and the latter is not stripped off during the drawing but is maintained over the entire length of the wire. Furthermore, the zinc cladding remains firmly bonded to the aluminum core after the drawing stage, and harmful flaking or splintering off is not observed.

It is believed that this invention will be even more clearly understood from the following discussion of illustrations of the practice thereof, in conjunction with the drawings filed herewith.

Figure 10:
Figure 11:
Figure 12:
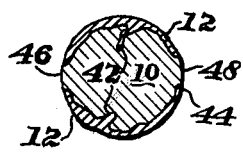
Figure 13:
Figure 14:
Figure 15:
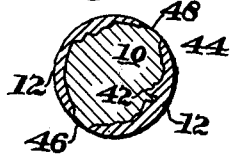
Figure 16:
Figure 17:
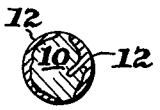
Figure 18:
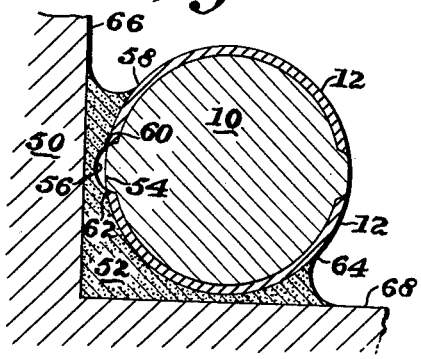

In the drawings:

FIGURES 1, 2, 3, and 4, respectively, show, in cross-section, four successive stages of rolling a generally rectangular strip material (FIG. 1) into a substantially round redraw rod (FIG. 4);

FIGURES 5, 6, 7, and 8, respectively, show, in cross-section, a similar four-stage illustration of rolling the strip composite material (FIG. 5) into a substantially round redraw rod (FIG. 8), and illustrate in conjunction with FIGURES 1, 2, 3, and 4, variations in the configuration of the zinc cladding on the aluminum core during these operations;

FIGURES 9, 10, and 11, show, respectively, in cross-section, successive stages of drawing of the redraw rod of, say, FIGURE 4 or FIGURE 8, to the wire;

FIGURES 12, 13, and 14, show, respectively, in cross-section, another series of drawing steps to form a wire according to this invention;

FIGURES 15, 16, and 17 show, respectively, in cross-section, another series of three stages during this drawing operation;

FIGURES 9, 10, and 11, and FIGURES 12, 13, and 14, and FIGURES 15, 16 and 17, together show variations in the configuration of the zinc cladding during the respective drawing operations and stages thereof; and FIGURE 18 shows, in cross-section, a zinc clad aluminum wire made according to this invention, and soldered to a metallic body, and illustrates the configuration of the solder.

As an example of the practice of this invention, an EC aluminum ingot about two and three-quarters inches thick was clad on both sides with zinc according to the co-pending applications, heretofore referred to, and was rolled to a gauge of about .195 inch, the zinc coating on the rolled sheet amounting to about 20% of its total volume. The rolled composite sheets were formed in lengths of about 10 feet or longer and widths of about 7 to 8 inches. These sheets were then slit longitudinally to produce slit strips of about one inch in width. These slit strips were next cold-rolled to a round, or substantially round, redraw rod of about ⅜ inch diameter. During this operation, some unclad free aluminum surface, originating from that initially existing at the edge of each slit strip was evident in the cold-rolled rod; however, its surface dimension had been somewhat decreased by an apparent "spreading" of the zinc cladding over its surface. It will be appreciated, of course, that the zinc cladding does not literally "spread," in the sense of a movement of a discrete part thereof with respect to a discrete part of the aluminum surface at the zinc aluminum interface; but, rather, the effect is one resulting from the geometrical deformation of the strip as a whole.

Next, the redraw rod was drawn down through a series of dies to form a wire of the desired diameter. The series of dies which were used in this example had the following respective orifice diameters: 0.331"; 0.291"; 0.265"; 0.222", 0.188", 0.158", .0133", 0.122", 0.9975", 0.9846", and 0.0775". The percent reduction in this cross-sectional area of the rod or wire in passing each of these respective dies followed the following series: 22%, 23%, 17%, 30%, 28%, 29%, 29%, 29%, 24%, 24%, and 17%. The wire produced as a result of this procedure had a diameter of about 0.0772". Microscopic examination thereof revealed that the wire was composed of a solid core of aluminum covered substantially about its entire circumference and over its entire length with a thin cladding of zinc metal. As will be noted by reference to the drawings, it is also observed that some aspects of the configuration of the zinc cladding on the original cold-rolled rod are retained in the same form on the drawn rod.

That is, examinations of cross-sections of the cold-rolled rod will reveal that a certain amount of wrinkling and/or folding of the zinc skin can take place during the rolling operation. Apparently, this is due to the differences in the metallurgical characteristics of zinc and aluminum used in this particular example. Frequently, "tails" of zinc will be folded more or less centripetally into the rod, and sometimes some slivers of the zinc will be formed by the wrinkles on the surface of the rod. Where such centripetal folds occur in the rod, they will sometimes be observed in the wire drawn down from the roll. On the other hand, where zinc slivers or splinters exist on the surface of the rod, and extending outwardly therefrom, they are frequently substantially removed or eliminated during the die-drawing operations to form the wire, and the latter produced generally has a smooth surface contour, though some slivering may remain.

Thus, it will be noted in referring to FIGURE 1, wherein 10 indicates the aluminum core and 12 the zinc cladding sheets bonded thereto, that in the first rolling pass to form an elliptical cross-section, a small fold 14 and a small wrinkle 16 are formed on one portion of zinc cladding 12. After the second rolling stage, shown in FIGURE 3, the wrinkles and folds in zinc cladding 12 have been somewhat increased as 18, 20, 22, and 24, and wrinkles appear at 26 and 28 and insipient wrinkles at 30 and 32. (Of course, since the drawings were made from photomicrographs of cross-sections of the article, the cross-section of FIGURE 3 does not correspond to the same actual piece of material shown in cross-section in FIGURE 2—this applied to the other figures shown in these drawings as well.) FIGURE 4 illustrates the last stage of the rolling operation used in this example wherein, again, 10 indicates the aluminum core and 12 indicates the zinc cladding. As will be noted, areas 34 and 36 on this redraw rod correspond to the bare edges 10a and 10b, FIGURE 1, of the original slit strip of the zinc clad aluminum composite. Areas 34 and 36 are somewhat smaller than areas 10a and 10b. In addition, at some specific regions, such as 38 and 40, the zinc cladding has a thickness actually greater than that of the original cladding 12 shown in FIGURE 1. At other specific regions such as 42, the zinc cladding is materially thinner. In all instances, and at all regions in the interface between the aluminum core 10 and the zinc cladding 12, the strength of the bond between these two is preserved through the rolling operations.

FIGURES 5, 6, 7, and 8 show much the same phenomena, with the numbers therein corresponding to those indicated in the above description of FIGURES 1, 2, 3, and 4.

While neither FIGURES 4 nor 8 specifically illustrate the phenomenon, in some instances a wrinkle such as shown at 26 or at 28, or an insipient wrinkle, such as shown at 30 or at 32, will remain on the surface of the zinc cladding after the final rolling pass to form the redraw rod of FIGURE 4 or FIGURE 8. Since the rolling operation from the slit strip shown in FIGURE 1 or FIGURE 5 to the redraw rod shown in FIGURE 4 or FIGURE 8 was done cold, the overlap of the zinc metal at, say, wrinkle 26 or 28, is not adhered to the zinc cladding 12 which is bonded to the aluminum core 10. As a consequence, in the substantially round redraw rod these wrinkles will lead to rolled thin slivers of zinc which may splinter off. Such splintering, however, is only of that small section of the zinc metal, and the aluminum surface remains covered by the main body of the zinc cladding.

Referring now to FIGURES 9–17, these are respectively taken from a series of die-drawings of the rod to the wire, as described above. Again, in each drawing, 10 and 12 designate the aluminum core and zinc cladding, respectively. FIGURE 9 shows a cross-sectional configuration after a first stage of drawing the rod of FIGURE 4 and FIGURE 8 to the wire. It will be seen that there is a fold 42 extending inwardly into the body of the aluminum core, and resulting, in its immediate area, in a localized thick layer of zinc. In other areas, the thickness of the zinc cladding has been still further reduced, for instance, at 44, and unclad areas 46 and 48 are still further reduced in size, percentage-wise with respect to the total circumference of the wire.

As indicated the cross sections illustrated in the drawings were made according to the above-described example of the process. Each of the rolled thin composites shown in FIGURES 1 and 5 were prepared from a composite of a thickness of about three inches. The sheet shown in FIGURE 1 contained about 20% of cladding (10% on each side), the zinc being an alloy of 99.99% pure zinc with from 0.06–0.07% titanium added thereto. This composite after rolling, preparatory to the slitting step, had a thickness of about 0.210 inches. The rolled composite shown in FIGURE 5 had a thickness of about 0.194 inch and had a total of about 20% of 99.99% zinc cladding (again, 10% on each side).

The wire shown in FIGURES 9, 10, and 11 was prepared from the rod shown in FIGURES 5, 6, 7, and 8. On the other hand, the wire shown in FIGURES 12, 13, and 14 was prepared from a rolled composite about 0.166 inch thick having 20% cladding of 99.99% zinc alloyed with 0.09% titanium; the composite otherwise appearing as shown in FIGURE 1 or FIGURE 5. The wire shown in FIGURES 15, 16 and 17 was prepared from a composite having a total cladding of 40% (20% on each side) of 99.99% zinc, rolled to a thickness of 0.185 inch.

In each instance, the redraw rod corresponding to FIGURE 4 or FIGURE 8 was of a diameter of about ⅜ of an inch prepared from a slit strip of the indicated rolled composite.

Various physical characteristics of these materials are indicated in the following tables:

*Table I.—Zinc clad slit strip and ⅜″ redraw rod properties*

| Sample | Slit Strip | | ⅜″ Rod, F Temper [3] | | ⅜″ Rod, Stress Relieved | |
|---|---|---|---|---|---|---|
| | TS [1] | Percent El.[2] | TS [1] | Percent El.[2] (10 in.) | TS [1] | Percent El.[2] |
| A | 23.5<br>24.0 | 16.0<br>16.0 | 26.0 | 5.2 | 19.0 | 16.6 |
| B | 23.3<br>23.7 | 21.0<br>21.0 | 23.5 | 9.4 | 16.8 | 10.6 |
| C | 23.4<br>24.2 | 17.0<br>17.0 | 25.6 | 7.8 | 18.5 | 15.4 |
| D | 23.3<br>24.5 | 14.0<br>18.0 | 25.9 | | 17.5 | |

A: Figs. 1–4.
B: Figs. 15–17.
C: Figs. 12–14.
D: Figs. 5–11.

[1] Tensile strength, 1,000 p.s.i.
[2] Elongation, percent in 10 inches.
[3] Temper as fabricated, no heat treatment.

*Table II.—Drawn zinc clad wire properties*

| Sample | .1327 Diameter Wire | | | .0772 Diameter Wire | | |
|---|---|---|---|---|---|---|
| | TS [1] | El.[2] | Percent IACS [3] | TS [1] | Percent El.[2] | Percent IACS [3] |
| A | 26.9 | 7.0 | 55.1 | 29.3 | | 54.8 |
| B | 25.4 | 7.4 | 52.0 | 27.4 | 5.3 | 51.3 |
| C | 27.2 | 5.7 | 54.2 | 29.3 | 3.6 | 55.5 |
| D | 26.7 | 3.8 | 55.1 | 29.1 | 3.7 | 55.9 |

A: Figs. 1–4.
B: Figs. 15–17.
C: Figs. 12–14.
D: Figs. 5–11.

[1] Tensile strength in 1,000 p.s.i.
[2] Elongation, percent in 10 inches.
[3] Test temperature 20° C.; test made on volume basis in accordance with ASTM 193-57.

As the above discussion will indicate, the cladding of the zinc about the circumferential surface of the composite wire, over its longitudinal length, may vary somewhat in thickness. At some localized points, due to the centripetal folding effect, this zinc cladding could be measured as extending perhaps as much as 30 or even 40% into the cross-sectional diameter of the wire. In other regions, particularly those immediately adjacent the area which was originally the unclad edge of the rolled aluminum strip, the thickness of the zinc cladding will diminish to a very small figure, becoming "zero" in the area where bare aluminum is left on the surface of the wire. In between these two dimensions, the thickness of the zinc cladding may vary rather irregularly but if the centripetal folds are ignored, there will generally be observed a "crescent moon" sort of configuration for this cladding over substantially a half circle of the surface of the wire. On the average, it can be said that the zinc cladding has a thickness of from about 0.05 to 40 percent, of the diameter of the wire.

Of course, it will be appreciated that the uniformity and thickness of the zinc cladding is affected by the percentage of zinc acutally on the original aluminum composite as well as by the centripetal folds and the alloys chosen for the composite. The invention has been illustrated above with composites with from 20 to 40% total of zinc cladding. Actually the amount of cladding can be considerably reduced, down to 10% total or even to about 5% total, without affecting the solderable characteristics of the wire product. Indeed, it is considered that the use of 10% total or less zinc cladding is the preferred method of operation in that any undesirable characteristics resulting from the wrinkles or folds discussed above will be to a large extent minimized, Predominantly, this folding or wrinkling is due to the variations in the mechanical properties of the two metals, and a thin pliable cladding sheet of zinc will more readily conform to the desired cylindrical shape during the rolling procedures to produce the redraw rod.

At the same time, the coating will be of sufficient thickness on the final wire product to permit soldering by the same techniques as would be employed with ordinary zinc articles.

In addition to the mechanical advantages of avoiding wrinkles and folds in the cross-sectional configuration of the zinc cladding on the wire product, it will also be appreciated that the weight/volume/conductivity properties of the wire will be improved without sacrifice of its solderability when the zinc cladding is relatively thin.

For instance, 0.0772 in. diameter wire made by the slit strip process of this invention, and having a core of EC aluminum and a cladding of pure zinc which is 20% of the volume of the wire, yields a conductivity of about 35% more than an equal weight of copper wire. When the volume is reduced to 10% of the composite, electrical conductivity will be on the order of 50% greater than an equal weight of copper.

In addition, it should be understood that the thickness of the original composite is not at all critical to the practice of this invention. In fact, from an economical standpoint, it is preferred to use thicker aluminum cores than those specifically described above, for instance, cores of about 13 inches thick. This is so because a larger quantity of wire may be produced from a given cladding operation when such thick materials are used, and the expense of the wire insofar as it is determined by the cladding operation may, accordingly, be reduced.

It will be understood that this invention is in no way limited to the particular method of producing the redraw rod insofar as the shape of the composite is concerned. That is, the above technique of forming a generally rectangular composite sheet, slitting it into strips, and then rolling these slit strips into redraw rods may be replaced by actually cladding a cylindrically shaped aluminum ingot with suitably curved sheets of zinc. The cladding technique must be the same as that already mentioned, i.e. according to applications, Serial No. 636,632, and Serial No. 700,719, referred to above. By the use of suitable rollers during this cladding stage, which rollers are conventional in general metal rolling technology, an initial cylindrical composite may be formed in this manner so that the resulting wire is fully clad around its entire circumference with the zinc metal.

This last feature can also be substantially obtained by initially cladding a substantially square aluminum ingot on all four sides with zinc. The square ingot may then be rolled directly to the redraw rod, without the intermediate rolling to a thin sheet followed by slitting of strips therefrom. The standard equipment for rolling square ingots into round ingots or rods is, of course, already well known and may be applied to the zinc-clad square aluminum ingot as well.

However, where a round or square core is used, and is fully clad with zinc, unless the zinc cladding is very thin, there will be a decreased conductivity of the wire as compared to wire made from slit strip for a given weight thereof. Since satisfactory soldering can be achieved with normal techniques and with a zinc clad aluminum wire which has some bare spots of aluminum (corresponding to the original edge of the slit strip, for instance), the techniques set forth in the above examples are generally considered entirely adequate for at least the majority of purposes.

The preferred aluminum alloy to use as the core is that commonly referred to as "EC" aluminum, which is a relatively pure electrical conductor alloy. In accordance with the description for the cladding step in applications, Serial No. 636,232, and Serial No. 700,719, the zinc cladding generally must be quite pure, for instance, 99.99% pure zinc. However, as also described in those applications, certain high melting constituents may also be present in the zinc material. For instance, as illustrated above, a small amount of titanium, for instance, up to about 0.15%, may be alloyed with the zinc and is advantageous to use because of its mechanical characteristics. An even better alloy is believed to be the same high grade zinc having up to about 0.5% of manganese incorporated therein. Still another alloy of zinc which may be used is one formed from the same high grade zinc with an added amount of about up to 15% of aluminum. From this last alloy group an alloy containing about 5% aluminum may well be preferred by many practitioners of this invention and for most uses to which the zinc clad aluminum wire will be put, especially where heat-tempering treatments will be desired. When substantially pure zinc is used, there is a tendency under the heating conditions or after long times at room temperature to form fairly large grains, and these are undesirable especially as relates to formability.

Additional alloys of aluminum other than the "EC" alloy which may be used include those having the standard designations of 5005, 1100 and 6101. These several alloys have the respective composition limits, as published by the Aluminum Association, as follows:

|  | EC Alloy | 6101 | 5005 | 1100 |
|---|---|---|---|---|
| Silicon | | 0.30–0.7 | 0.40 | } 1.0 Si+Fe. |
| Iron | | 0.50 | 0.7 | |
| Copper | | 0.10 | 0.20 | 0.20. |
| Manganese | | 0.03 | 0.20 | 0.05. |
| Magnesium | | 0.35–0.8 | 0.50–1.1 | |
| Chromium | | 0.03 | 0.10 | |
| Zinc | | 0.10 | 0.25 | 0.10. |
| Boron | | .06 | | |
| Others, Each | | 0.03 | 0.05 | 0.05. |
| Others, Total | | 0.10 | 0.15 | 0.15. |
| Aluminum | | 99.45 (min.) | Bal. | Bal. | Bal. (99.00 min.). |

Basically, these are the aluminum alloys which provide stronger cores and are still fairly easy to roll, i.e. they are readily plastically deformed, yet also possess good electrical conductivity.

These remarks will indicate, of course, that the primary considerations in the practice of this invention are that the composite, regardless of its shape, is prepared by the bonding technique described in applications, Serial No. 636,232, and Serial No. 700,719, and this composite is converted by rolling, or the strip slitting technique, or by any other appropriate method to redraw rod, which is then converted to the wire. It is preferred that the wire be formed from the redraw rod by a drawing technique; however, if desired, it is equivalently possible to continue to roll the redraw rod to smaller dimensions to form the wire entirely by a rolling technique, although presently an uneconomical method.

In FIGURE 18, there is illustrated, in cross-section, the manner in which the wire article provided by this invention may be soldered to a metal body. As can be seen from the illustration, metal body 50 is wetted by any conventional solder material 52, which in turn wets and forms a soldered bond with zinc-cladding 12 on the wire having aluminum core 10. The wire illustrated is one formed in accordance with the slit strip technique described above, and, as shown, the bare surface of aluminum at 54 is not wetted by solder 50, and a small cavity 56 is formed in that region. The area of soldered bonding extending from point 58 to point 60 and point 62 to point 64, is entirely adequate with respect to strength for structural purposes and with respect to conductivity for electrical purposes, so that even if the wire provided by this invention happens to be oriented as shown in FIGURE 18, a strong, low-resistance soldered joint is obtained. As will be understood, metal body 50 may be formed of any metal which is normally solderable. If it is desired that metal body 50 be substantially composed of aluminum because of its lightweight characteristics (as, for instance, in aircraft construction), it is then advantageous to employ a zinc-clad material formed in accordance with the aforementioned applications, Serial No. 636,232, and Serial No. 700,719, so that at surfaces 66 and 68, there is a thin coating of zinc. In addition, it is possible to supply sufficient heat and conventional fluxes to utilize the zinc cladding as the solder for the joint between the wire and another solderable surface. Of course, should it be desired, the wire may be conventially pretinned with tin or almost any solder for reasons similar to those for which copper wire is "tinned."

From the foregoing description of this invention, it will be seen that among the primary considerations in the choice of the aluminum core and the zinc-cladding alloy for the preparation of the zinc-clad wire are:

(1) Bonding quality must, of course, be good;
(2) The combination must be proportioned to yield the required electrical conductivity, both absolute and from a weight standpoint; and,
(3) The alloy combination should have the required strength properties.

These criteria may be satisfied by selecting the respective materials as indicated above and the composite zinc-clad aluminum article thereafter rolled and drawn to the wire as already described. It will be apparent that there are a number of specific combinations of alloys and methods which may be employed in the practice of this invention, which is, accordingly, limited only by the spirit and scope of the following claims.

What is claimed is:

1. A process for manufacture of a solderable zinc-clad aluminum wire which comprises forming strips from a composite formed from an aluminum metal ingot having a zinc metal cladding sheet metallurgically bonded to at least one exterior surface thereof, working said strips into redraw rod, and thereafter drawing said rod through at least one die to wire dimension while simultaneously extruding the said zinc cladding around the outer surface of the aluminum metal in said rod.

2. A process for manufacture of a solderable zinc-clad aluminum wire which comprises rolling an aluminum metal ingot of generally rectangular cross-section having zinc metal cladding sheets metallurgically bonded to two sides thereof to a thin composite, slitting said composite to form a plurality of strips composed of an aluminum core having two opposed surfaces metallurgically bonded to said zinc-cladding, cold-rolling said strips to form a redraw rod, and thereafter cold-drawing said rod through at least one die to wire dimension.

3. A process for manufacture of solderable zinc-clad aluminum wire which comprises cold-rolling a redraw rod from a composite composed of a generally cylindrical aluminum metal ingot having a zinc metal cladding sheet metallurgically bonded to the exterior thereof, and thereafter cold-drawing said rod through at least one die to wire dimension whereby a wire is formed composed of an aluminum core having its exterior surface substantially entirely covered with said metallurgically bonded zinc-cladding.

4. A process for manufacture of a solderable zinc-clad aluminum wire which comprises cold-rolling a redraw rod from a composite formed of an aluminum metal ingot of substantially square cross-section and having zinc metal cladding sheet metallurgically bonded on all sides thereof, and thereafter cold-drawing said rod through at least one die to wire dimension, whereby a wire is formed composed of an aluminum core having its exterior surface substantially entirely covered with said metallurgically bonded zinc-cladding.

5. A process for manufacture of a solderable zinc-clad aluminum wire which comprises cold-rolling a redraw rod from a composite formed from an aluminum metal ingot having a zinc-metal cladding sheet metallurgically bonded to at least one exterior surface thereof, wherein said zinc metal is selected from the group consisting of 99.99% pure zinc, zinc alloyed with up to about 0.15% titanium, zinc alloyed with up to about 0.5% manganese, and zinc alloyed with up to about 15% aluminum, and thereafter cold-drawing said rod through at least one die to wire dimension.

6. A process as in claim 5, wherein the aluminum metal in said ingot is selected from the group consisting of EC alloy, 6101 alloy, 5005 alloy, and 1100 alloy.

References Cited by the Examiner
UNITED STATES PATENTS

| | | | |
|---|---|---|---|
| 1,637,033 | 7/27 | Basch | 29—197 |
| 1,813,539 | 7/31 | Hurley | 29—547 |
| 2,074,712 | 3/37 | Tross | 29—547 |
| 2,100,255 | 11/37 | Larson | 29—197 |
| 2,234,491 | 3/41 | Hayden | 29—534 |
| 2,285,308 | 6/42 | Specht | 29—533 |
| 2,320,498 | 6/53 | Wheeler | 29—534 |
| 2,400,866 | 5/46 | Kronwall | 29—547 |
| 2,746,134 | 5/56 | Drummond | 29—197 |
| 2,770,031 | 11/56 | Schlucter | 29—197 |
| 2,987,814 | 6/61 | Singleton | 29—197 |
| 3,054,176 | 9/62 | Beneke | 29—528 |

DAVID L. RECK, *Primary Examiner.*

WHITMORE A. WILTZ, HYLAND BIZOT, *Examiners.*